United States Patent [19]

Ruppert

[11] Patent Number: 4,617,498

[45] Date of Patent: Oct. 14, 1986

[54] CONTROL DEVICE FOR SYNCHRONIZING A PLURALITY OF DRIVING UNITS

[75] Inventor: Martin Ruppert, Duisburg, Fed. Rep. of Germany

[73] Assignee: BSO Steuerungstechnik GmbH, Sulzbach, Fed. Rep. of Germany

[21] Appl. No.: 715,087

[22] Filed: Mar. 22, 1985

[30] Foreign Application Priority Data

Mar. 29, 1984 [DE] Fed. Rep. of Germany ....... 3411651

[51] Int. Cl.$^4$ .............................................. H02P 5/46
[52] U.S. Cl. ...................................... 318/85; 318/41; 318/638
[58] Field of Search .................... 318/41, 46, 85, 638, 318/700, 705

[56] References Cited

U.S. PATENT DOCUMENTS

| 3,906,324 | 9/1975 | Smith | 318/638 X |
| 3,934,182 | 1/1976 | Donohue et al. | 318/85 |
| 4,450,395 | 5/1984 | Kawamura et al. | 318/700 |

FOREIGN PATENT DOCUMENTS

| 57-134719 | 8/1982 | Japan | 318/638 |
| 0436326 | 2/1975 | U.S.S.R. | 318/638 |
| 0824131 | 4/1981 | U.S.S.R. | 318/638 |

*Primary Examiner*—William M. Shoop, Jr.
*Assistant Examiner*—Bentsu Ro
*Attorney, Agent, or Firm*—Harness, Dickey & Pierce

[57] ABSTRACT

The invention relates to a control device for synchronizing a plurality of driving units, the speed thereof controlled by a time-variable desired signal which is common for all units. For each driving unit a positional control means in combination with a speed control means is provided. The positional control means receives a signal for the desired position of the correlated driving unit which signal is produced in an integrating means from the desired speed signal and further receives a signal representing the actual position of the unit. The output signal of the speed control means is added to the desired speed signal modified in an amplifying network. The gain control of the amplifying network is selected such that the transient response of the compensating means is inversely proportional to the transient response of the actuating means and the drive unit. This allows for a high synchronizing accuracy.

6 Claims, 2 Drawing Figures

CONTROL DEVICE FOR SYNCHRONIZING A PLURALITY OF DRIVING UNITS

BACKGROUND OF THE INVENTION

In a conventional synchronizing system, a desired speed signal and a speed signal indicating the actual speed of a master driving unit are fed to a comparing means producing a differential signal by subtracting the actual speed signal from the desired speed signal. The differential signal is fed to the control means controlling the speed of the master unit. The speed control means produces a control signal which is directly supplied to the master unit and which is further supplied to the slave units after adding a supplemental control signal. For generating the supplemental control signal for all slave units a synchronizing controller is provided in which the difference of the actual positional signals of the individual drive units is determined. The actual positional signals of the units each are derived from the actual speed values of the units in an integrating member. The conventional synchronization exhibits relatively large inaccuracies. This is particularly true in synchronizing a plurality of hydraulic cylinders which have inherent dragging errors so that the conventional control results in relatively uneven loads between the master cylinder and the slave cylinders.

SUMMARY OF THE INVENTION

It is an object of the present invention to improve a control device in order to obtain a very accurate and stable synchronization, in particular for synchronizing a plurality of hydraulic cylinders.

The improvements achieved by the present invention are obtained by a control device for synchronizing a plurality of driving units, in particular a plurality of hydraulic cylinders, each driving unit actuated by actuating means, in particular by a proportional valve, comprising (a) an integrating means receiving a desired time-variable speed signal and producing a desired position signal, said integrating means provided for all said driving units, and further comprising the further following means for each individual driving unit (b) a comparing means receiving said desired position signal and an actual position signal of the correlated unit and producing a first error signal, (c) a positional control means receiving said first error signal and producing a control signal, (d) a compensating means receiving said desired speed signal and producing a correcting signal compensating the time delay caused by the transient response characteristic of the correlated unit including said actuating means and (e) an adding means receiving said correcting signal and said control signal and producing a second error signal fed to said actuating means.

According to the invention, the control means for all driving units are identical in structure, eliminating different control systems for a master drive and the slave units. In contrast to the conventional synchronizing control which has a synchronizing error even when the desired speed signal is selected to be constant, the synchronizing error of the synchronizing control of the present invention is zero when the deviations of the individual control means are constant, and is zero even in the case when the desired speed signal is linearly varied to provide speed ramps for the motion of the driving units.

BRIEF DESCRIPTION OF THE DRAWING

Two embodiments of the invention are described below with reference to the accompanying drawing in which FIG. 1 diagrammatically shows a control device including a positional and a speed control means for each unit and FIG. 2 diagrammatically shows a control device including a positional control for each unit.

DETAILED DESCRIPTION OF THE PREFERRED EMBODIMENTS

Figure 1:
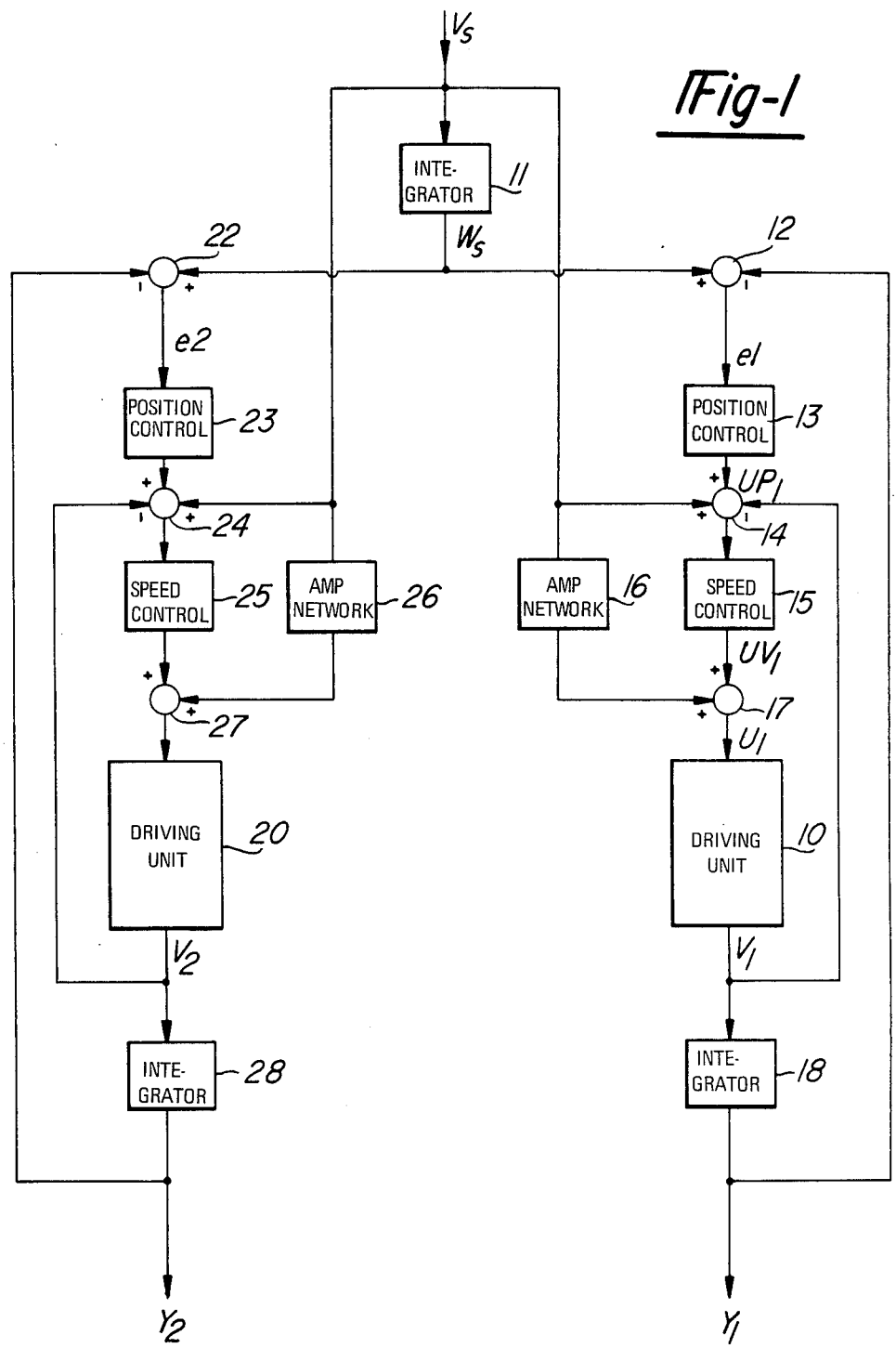

FIG. 1 shows driving units 10 and 20 to be synchronized. In a preferred embodiment, the driving units are hydraulic cylinders to be actuated by pressurized fluid which is supplied by a directional proportional valve defining an actuating means. The actuating means associated with the units 10 and 20 are not shown. When a voltage $U_1$ is supplied to the actuating means, the unit 10 performs a motion which has a particular speed $V_1$ defining the actual speed signal.

The speed of all units is set by a desired speed signal $V_s$. This signal is time-variable which means that it may be varied during the motion of the unit. The desired speed signal $V_s$ is fed to an integrating member 11 delivering a further desired signal namely the desired position signal $W_s$. Both signals $V_s$ and $W_s$ are commonly applied to the control device for the drive unit 10 as well as to the control device for the unit 20.

The circuitry for each control device is of identical structure and that of the drive unit 10 comprises a comparing means 12, a positional control means 13, a further comparing means 14, a speed control means 15, an amplifying network 16, a comparing means 17 and an integrating means 18.

The control device for the driving unit 20 is made up of identical components, such as the comparing means 22, 24, and 27, a positional control means 23, a speed control means 25, an amplifying network 26, and an integrating means 28.

It should be noted that the integrating means 18 and 28 are associated to the correlated driving unit and thus are not components of the control device since the integrating means integrates the actual speed V to generate the actual position Y of the driving unit. Accordingly, the integrating means is merely shown to explain the physical interrelation between the speed V and the position Y.

The desired position signal $W_s$ and the actual position signal $Y_1$ of the unit 10 which signal is generated from the speed $V_1$ of the unit 10 in the integrating means 18, are fed to the comparing means 12. The actual position signal $Y_1$ is subtracted from the desired position signal $W_s$ and the difference e1 is supplied to the positional control means 13 which generates a first control signal $U_{P1}$.

The comparing means 14 generates an input signal for the speed control means 15 by adding the first control signal $U_{P1}$ to the desired speed signal $V_s$ and by subtracting the actual speed signal $V_1$. The speed control means delivers a second control signal $U_{V1}$ to the comparing means 17 in which a correcting signal from the amplifying network 16 is added to generate a second error signal $U_1$ which is fed to the actuating means of the drive unit 10.

The control response of the positional control means 13, the speed control means 15 and the amplifying network 16 are selected such that the accuracy of the control is as high as possible. The transfer characteristics of the positional control means 13 and speed control means 15 are selected in a conventional manner. Preferrably the positional control means 13 is a proportional-differentiating controller and the speed control means 15 is a proportional integral differentiating controller. This is particularly preferred for driving units exhibiting a linear transient response, wherein the dynamic response of all units is made identically as nearly as possible by a corresponding selection of controllers.

Contrarily, the amplifying network 16 has a transient response characteristic which is inverse with respect to the correlated driving unit 10 including the actuating member thereof. In other words, the desired speed signal $V_s$ modified in the amplifying network 16 shall vary the second control signal $U_{Vl}$ of the speed control means 15 in an overproportional amount such that the reaction of the actuating member and the driving unit is accelerated. Provided the transient response characteristic of the amplifying network 16 is inversely proportional to the product of the transient response characteristics of the driving unit and of the actuating member, then the control may be performed under ideal conditions.

In fulfilling the particular response characteristic referred to above, the static error in the first error signal e1 of the comparing means 12 becomes zero at a constant desired speed signal $V_s$ to obtain an ideal synchronization. This particularly applies where the speed control means 15 is a proportional differential controller which does not include an integrating characteristic.

Contrarily, when the speed control means 15 includes an integrating characteristic, the static error e1 becomes zero for a desired speed signal having uniform acceleration.

The control device according to the invention allows to synchronize a plurality of driving units which are particularly insensitive to disturbances, wherein each individual unit is independently controlled from the other units. A proper adjusting of the control means 13 and 15 and amplifying network 16 results in a substantially identical dynamic response of the control circuit for each individual unit so that the units are substantially more evenly loaded.

Figure 2:
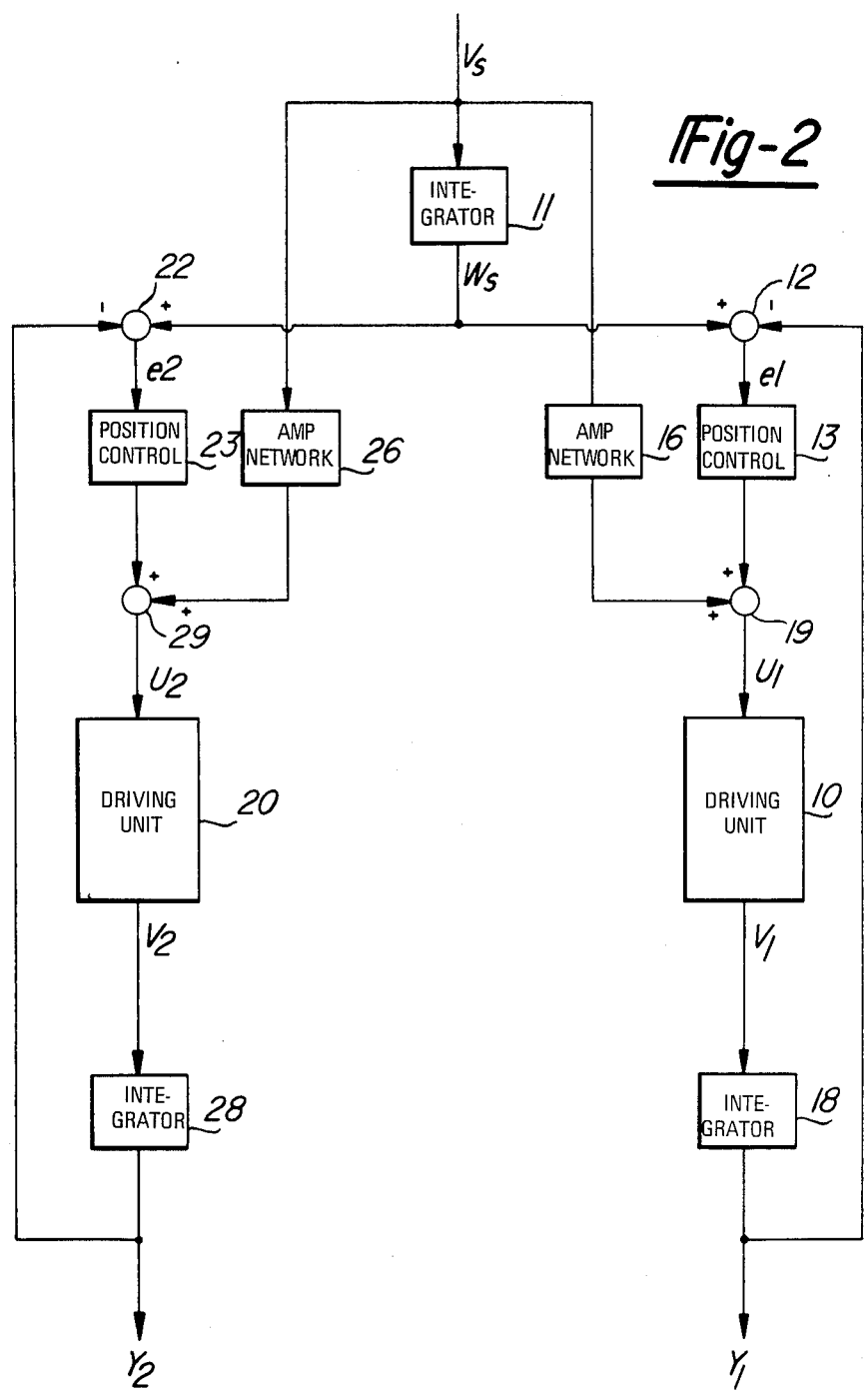

In case that the requirements to the accuracy of synchronization are not that high, a further simplified embodiment may be chosen eliminating the speed control means. This is shown in FIG. 2 in which identical components bear identical reference numerals. According to FIG. 2, the integrating means 11 again integrates the desired speed signal $V_s$ to the desired position signal $W_s$, and the comparing means 12 subtracts therefrom the actual position signal $Y_1$, whereupon the positional control means 13 generates a control signal which is supplied to the comparing means 19. The output signal of the amplifying network 16 modifying the desired speed signal $V_s$ is added to the output signal of the positional control means 13. Accordingly, a signal $U_1$ is produced to control the actuating member of the driving unit 10. Here again, the amplifying network 16 has a response characteristic which is inverse to the response characteristics of the actuating member and the unit. In an effort to simplify the response characteristic of the amplifying network, the inverse response characteristic thereof may be approximated by a static gain control of the amplifying network 16 which gain control corresponds to the inverse value of the gain characteristic of the actuating member and of the driving unit. This control circuit results in a substantially improved accuracy compared with a conventional synchronization, although the static error of the error signal e1 applied to the positional control means 13 is not zero anymore for a constant desired speed signal $V_s$.

What I claim is:

1. A control device for synchronizing a plurality of driving units such as a plurality of hydraulic cylinders, each driving unit being actuated by an actuating means such as by a proportional valve, comprising
   (a) an integrating means receiving a time-variable, desired speed signal for producing a desired position signal, said integrating means being common for all of said driving units, and further comprising for each individual driving unit,
   (b) a comparing means for comparing said desired position signal and an actual position signal from the correlatdd unit for generating a first error signal,
   (c) a positional control means receiving said first error signal and generating a control signal,
   (d) an amplifying network receiving said desired speed signal and generating an amplified signal compensating for a time delay caused by a transient response of the correlated unit including the correlated actuating means and
   (e) an adding means receiving and summing said amplified signal and said control signal for producing a second error signal fed to said actuating means.

2. A control circuit according to claim 1, wherein said amplifying network generates an amplified signal which minimizes the difference between the position of the driving unit and said desired position signal.

3. A control device for synchronizing a plurality of driving units such as hydraulic cylinders, each driving unit being actuated by an actuating means such as by a proportional valve, comprising
   (a) an integrating means receiving a time-variable, desired speed signal for producing a desired position signal, said integrating means being common for all of said driving units, and further comprising for each individual driving unit,
   (b) a comparing means for comparing said desired position signal and an actual position signal from the correlated unit for generating a first error signal,
   (c) a positional control means receiving said first error signal and generating a first control signal,
   (d) a speed control means receiving said desired speed signal and an actual speed signal from the correlated unit and generating a second control signal,
   (e) an amplifying network receiving said desired speed signal and generating an amplified signal compensating for a time delay caused by a transient response of the correlated unit including the correlated actuating means, and
   (f) an adding means receiving and summing said amplified signal and said second control signal for producing a second error signal fed to said actuating means.

4. A control according to claim 3, wherein said amplifying means produces an amplified signal which minimizes the difference between the position of the driving unit and said desired position signal.

5. A control circuit according to claim 3, further comprising a second comparing means connected between said positional control means and said speed control means, said second comparing means receiving an actual speed signal of the correlated driving unit, said desired speed signal and said first control signal and generating a third error signal fed to said speed control means.

6. A control circuit according to claim 5, wherein said amplifying network produces a correcting signal which minimizes the difference between the speed of the driving unit and said third error signal.

* * * * *